United States Patent [19]

Voigt et al.

[11] 3,802,897
[45] Apr. 9, 1974

[54] WATER RESISTANT STARCH ADHESIVE
[75] Inventors: John E. Voigt, Fenton; Edward M. Bovier, both of Dellwood, Mo.
[73] Assignee: Anheuser-Busch Incorporated, St. Louis, Mo.
[22] Filed: Feb. 23, 1973
[21] Appl. No.: 335,060

[52] U.S. Cl. .............................. 106/213, 260/17.4
[51] Int. Cl. ............................................ C08b 25/02
[58] Field of Search ............... 260/17.4 ST; 106/213

[56] References Cited
UNITED STATES PATENTS
3,640,740   2/1972   Stephan .............................. 106/138

Primary Examiner—Theodore Morris
Attorney, Agent, or Firm—Gravely, Lieder & Woodruff

[57] ABSTRACT

This invention relates primarily to innovations in starch based adhesives for use in the manufacture of waterproof and weather resistant corrugated paperboard and may also be used for adhesive purposes with laminated or solid paperboard. More specifically, it concerns the preparation of a water-resistant, essentially odorless, non-irritating paperboard adhesive using resorcinol and one of a series of compounds known as oxazolidines by reacting the materials "in situ" in a standard corrugating mix resulting in a starch base adhesive which has a superior viscosity, pH, and gel temperature stability.

7 Claims, No Drawings

WATER RESISTANT STARCH ADHESIVE

BACKGROUND OF THE INVENTION

It has been shown in U.S. Pat. Nos. 2,884,389 and 2,886,541 that a starch base corrugating adhesive can be produced that is highly water resistant to waterproof in nature. Briefly, these two patents disclose reacting phenolic compounds, such as resorcinol, with an aldehyde, such as formaldehyde, under alkaline conditions in the presence of pasted starch so as to form in situ a phenolic-aldehyde resin-starch reaction product. The teaching of these two patents has been employed on a substantial commercial scale in the production of highly water-resistant to waterproof corrugated and laminated paperboard products. U.S. Pat. No. 3,294,716 teaches the addition of borax to the general phenol-aldehyde-starch formula, along with the reduction of concentration of the phenolic compound, to reduce costs and increase machine speed rates for particular corrugated paperboard products that do not require a high degree of water resistance.

A disadvantage of the alkaline curing aldehydic amylaceous adhesive composition is their limited pot life. Pot life is the length of time, after preparing the adhesive with desired viscosity and other properties, during which the glue properties remain within a range suitable for use. The glue viscosity gradually increases with age, due to polymerization of the water resistant agent as well as a reaction of the water resistant agent with the amylaceous component of the glue. The thickening is often accompanied by congealing or gelling of the fluid composition. This change in composition can create operating difficulties for the manufacturer in that it would interfere with the application of the product, increase labor to keep the corrugating machines clean, and limit production of the product to batches small enough to be used within its pot life.

An effective technique for controlling the rate and degree of copolymerization, and thus the viscosity and pot life, is to control the temperature used in pasting the starch components. This in turn controls the degree of dispersion of the starch or dextrin and therefore the availability of the hydroxyl group for reaction with other groups. Starch cooked at the boiling temperature of water or higher is therefore much more reactive than starch cooked at lower temperatures. Alkalinity also has a bearing on the degree of pasting of the starch or dextrin since, in general, increases in alkalinity tend to decrease the pasting temperature.

Accordingly, researchers in the art have used sophisticated methods of altering the variables of time, temperature, alkalinity, and pH in adjusting the viscosity of the product to lengthen the pot life or working life of the product. See Kesler et al. U.S. Pat. No. 2,650,205, Corwin et al. U.S. Pat. No. 2,884,389, and Langlois et al. U.S. Pat. No. 2,890,182.

U.S. Pat. No. 2,890,182 teaches a method of increasing the pot life of the alkaline-curing aldehydic amylaceous adhesives by adding an ingredient, such as ammonia, to the completed liquid adhesive composition that competes with the amylaceous material and the non-aldehydic component of the water resistant agent for the aldehyde and thus slows the condensation responsible for the thickening and congealing of the composition.

The present invention relates to an improvement in the length of the working life of low temperature curing starch base adhesive, with said adhesives having increased viscosity stability, and improved gel temperature and pH characteristics.

Stephan U.S. Pat. No. 3,640,740 shows an adhesive composition comprising a combination of an alkaline-dispersed protein and an oxazolidine.

SUMMARY OF THE INVENTION

It is an object of this invention to provide an improved process for corrugating and laminating paperboard. Another object of this invention is to provide odorless adhesives having stable viscosity, gel temperature and pH with a longer working life.

It has been discovered that an adhesive composition comprising a combination of a phenol, alkaline dispersed starch, and an oxazolidine represented by the formula:

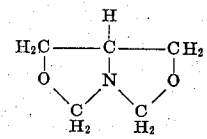

wherein R is an ethyl or hydroxymethyl group, possesses water resistant characteristics. When R is an ethyl group, the oxazolidine is 5-ethyl-1-AZA-3,7-dioxa-bicyclo [3, 3, 0] octane, which hereinafter will be referred to as oxazolidine E; when R is a hydroxymethyl group, the oxazolidine is 5-hydroxymethyl-1-aza-3,7,dioxabicyclo-[3, 3, 0] octane, which hereinafter will be referred to as oxazolidine T.

DETAILED DISCUSSION

Basically, this adhesive is made similarly to the phenol-aldehyde alkaline curing starch base adhesives. The critical difference is the substitution of an oxazolidine for an aldehyde. The concentration of the oxazolidine is related by way of a mol ratio to the phenolic compound, which should be greater than about 0.5 to 1 and preferably 1 to 1. The amount of oxazolidine may be as much as 3 to 1.

The bicyclic oxazolidines used in the adhesives of the present invention may be prepared according to the method of Murray Senkus, J.M. Chem. Soc. 67, 1515–1519 (1945) or that of W. B. Johnston, U.S. Pat. No. 2,448,890. Oxazolidine E is preferred, being more reactive than oxazolidine T.

The starch employed in this invention preferably is unmodified corn starch, but can be any of the starches commonly used in the adhesive art, that is, all starches and dextrins which contain sufficient available hydroxyl groups so that a copolymerization reaction can occur between them and the other two reactants. The starch or dextrin concentration in any particular adhesive formulation depends upon the specific formulation involved and the type of starch or dextrin used. A suggested starch formulation is 1 part starch to about 2 to about 8 parts water, and preferably 1 part starch to 3 to 6 parts water is used. The greater the percentage of starch or dextrin used, the lower will be the water resistance of the adhesive.

The phenolic compound concentration should be from about 2 to about 20 percent by weight of the starch, preferably 3 to 7.5 percent. Insofar as the phenolic compounds useful in the invention are concerned, they include resorcinol, phenol, hydroquinone, pyrocantechol, pyrogallol, phloroglucinol, hydroxyhydroquinone, 3,5-xylenol, metacresol, and bisphenol.

There should be sufficient caustic soda or other alkali used to give a pH of about 8.5 to about 12 in the final mix, preferably 10–11.5. This is about 1 to 4 percent NaOH by weight based on the weight of starch. The NaOH is used to assist in the dispersion of the cooked starch portion, to make the reaction alkaline for the alkaline setting adhesive, and to lower the gelatinization temperature of the raw starch.

In the final composition, the starch should be about 19 to about 30 percent by weight; the phenolic compound should be about 0.4 to about 6 percent by weight; the oxazolidine should be about 0.25 to about 20 percent by weight; and the water should be about 80 to about 57 percent by weight.

Of the starch, about 17 to about 36 percent is gelatinized and about 83 to about 64 percent is not gelatinized. The gelatinized starch can be pregelatinized or can be gelatinized in the presence of the phenolic compound. The latter is preferred.

There are two procedures to be used in practicing the invention, a two batch preparation and a one batch preparation, each of which depends upon the needs of the manufacturer. Example No. I illustrates the two batch procedure and Example No. II illustrates the one batch procedure.

A preferred procedure is to mix a part of the starch and the phenolic compound in water under agitation and heat to a temperature of 125°–200°F., preferably 140°–160°F., for about 10 minutes. At this time the swelling of the starch begins, and alkali is added to give the slurry a pH of about 10–11.5. Complete dispersion of the starch has not yet occurred and is not desired at this time. More water, the remainder of the starch, and the oxazolidine is added. The temperature is lowered to 90°F. to 120°F. and within 1–2 hours an adhesive composition will be obtained which is essentially odorless, has a stabilized viscosity of 15–120 sec. measured by the Brass Cup method, and a satisfactory pot life of 24 to 48 hours or longer. The preferred stabilized viscosity is 20–60 sec. The product can be used in the manufacture of corrugated or solid paperboard and possesses a waterproof bond on drying.

The final product involves a polymerization reaction involving starch, the phenolic compound and the oxazolidine compound. This results in a number of complex polymers with varying molecular weights with no single resultant formula.

The following examples disclose a number of practical embodiments of the invention which serve to illustrate the invention and suggest other similar embodiments to those skilled in the art. All parts of ingredients are by weight.

EXAMPLE I

A mixture of 100 parts pearl corn starch and 45 parts of resorcinol was slurried in 600 parts of water. Twenty-six parts of a 25 percent NaOH solution was added to give a pH of 10. The slurry mixture was heated to 150°F. and maintained at that temperature for 10 minutes to paste the starch. It was cooled by the addition of 625 parts of water and stirred for 10 minutes. In a second batch, 500 parts of pearl corn starch and 60 parts of oxazolidine E were slurried in 1045 parts of water. The primary mixture was slowly mixed into the secondary. The resultant mixture was kept at 105°F. to 115°F. for 1 to 2 hours and was ready for use on corrugated board and gave a water resistant bond comparable to the phenol-aldehyde resin adhesives. It is not necessary to wait 1 to 2 hours before using, however, better water resistance is obtained by doing so. This gives the starch, the phenolic compound and the oxazolidine a chance to polymerize.

Another adhesive was prepared according to the procedure used for Example I with the exception that 25 parts of paraformaldehyde were added instead of 60 parts of oxazolidine E. This adhesive, when used to glue corrugated board 1 hour after preparation, gave excellent water resistant bonds. However, it had a very strong, irritating odor and its viscosity significantly increased with time. In fact, after 24 hours it was so viscous that it could not be used to glue corrugated board. On the other hand, the adhesive prepared with oxazolidine E, as set forth in Example I, was essentially odorless and after 24 hours the viscosity remained unchanged. Corrugated board glued with the oxazolidine E adhesive 24 hours after preparation still gave excellent water resistant bonds. This illustrates that the adhesive prepared according to this invention has improved viscosity stability and improved pot life over a similarly prepared adhesive made with formaldehyde.

In this procedure, the unpasted starch of the second batch is held by the pasted "carrier" starch of the first batch. The hot rolls of the corrugating machine paste the unpasted starch in the usual manner and firm bonds are produced. But this formulation is also effective in cold laminating applications wherein the laminating rolls are not heated. The presence of the unpasted starch in the formulation provides for effective waterproofing. This is significant since only a limited amount of pasted starch can be used due to its high viscosity and a much larger amount of unpasted starch may be used without increasing the viscosity of the mixture. This is an unexpected result in the improvement in water proofness, for the unpasted starch would normally be expected to act as a diluent and weaken the adhesive bond.

EXAMPLE II

A mixture of 40.7 parts of pearl starch and 8.7 parts of resorcinol were slurried in 275 parts of water with agitation. The slurry mixture was heated to 140°F. for 10 minutes. 21.2 parts of 25 percent NaOH solution was added and mixed for 10 minutes. Approximately 284 parts of water was added followed by 164 parts of pearl corn starch. Finally 11.6 parts of oxazolidine E was added. This mixture was kept at a temperature of 105°F. to 115°F. for 1–2 hours, and upon drying after application to corrugated board in the usual manner, gave a water resistant bond comparable to the phenol-aldehyde resin adhesives.

The second portion of water is added to lower the temperature of the pasted starch so that when the unpasted starch is incorporated into the mixture it does not gelatinize.

EXAMPLE III

A primary mixture of 100 parts of pearl corn starch and 45 parts of resorcinol were slurried in 600 parts of water. Twenty-six parts of a 25 percent NaOH solution was added. The mixture was heated to 145°–160°F. and held for 10 minutes.

In a secondary mixture, 500 parts of pearl corn starch and 60 parts of oxazolidine T were slurried in 1045 parts of water. The primary was slowly mixed into the secondary. The resultant mixture was kept at 105°F. to 115°F. for 1 to 2 hours. This viscosity stable, essentially odorless adhesive was used to glue corrugated board and gave a water resistant bond.

What is claimed is:

1. A method of making a starch based adhesive comprising the steps of (a) preparing an aqueous alkaline gelatinized starch carrier containing a phenolic compound selected from a group consisting of resorcinol, phenol, hydroquinone, pyrocantechol, bisphenol, 3,5-xylenol, metacresol, pyrogallol, phloroglucinol and hydroxy-hydroquinone and a portion of the total starch solids, (b) mixing therein an aqueous slurry containing the remaining portion of the total starch solids and at least one oxazolidine selected from a group consisting of oxazolidine E or oxazolidine T which is represented by the formula:

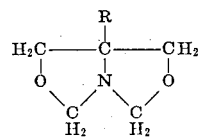

wherein R is an ethyl or a hydroxymethyl group.

2. The method of claim 1 wherein the starch carrier is prepared by pasting an aqueous alkaline slurry containing a phenolic compound and a portion of the total starch solids at a temperature of at least about 130°F.

3. The method of claim 1 wherein the oxazolidine is present in the mol ratio of oxazolidine to phenolic compound of at least about 0.5 to 1 and said phenolic compound being present in an amount of about 2 to about 20 percent by weight of the starch.

4. The method of claim 1 wherein the pH of the adhesive is about 8.5 to about 12.

5. The method of claim 1 wherein the final product is held at a temperature of about 90°F. to about 120°F. for at least about 1 hour before use.

6. A starch based adhesive comprising
   A. about 19 to about 30 percent starch by weight,
   B. about 0.4 to about 6 percent of a phenolic compound by weight, selected from a group consisting of resorcinol, phenol, hydroquinone, pyrocantechol, bisphenol, 3,5-xylenol, metacresol, pyrogallol, phloroglucinol and hydroxy-hydroquinone
   C. about 0.25 to about 20 percent by weight of an oxazolidine, and the oxazolidine is selected from a group consisting of oxazolidine E or oxazolidine T which is represented by the formula:

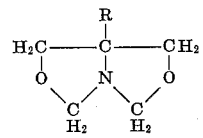

wherein R is an ethyl or a hydroxymethyl group, and
   D. about 80 to about 57 percent water by weight,
   E. said adhesive being at an alkaline pH.

7. The adhesive of claim 6 wherein about 17 to about 36 percent of the starch is gelatinized and about 83 to about 64 percent of the starch is in ungelatinized form.

* * * * *